(12) United States Patent
Wei (10) Patent No.: US 6,861,822 B2
(45) Date of Patent: Mar. 1, 2005

(54) BATTERY CHARGER HAVING ATTACHED BASE

(76) Inventor: Jose Wei, No. 17-2, Pai Ling Rd., Hsin Tien City, Taipei-Hsien (TW)

( * ) Notice: Subject to any disclaimer, the term of this patent is extended or adjusted under 35 U.S.C. 154(b) by 69 days.

(21) Appl. No.: 10/460,187

(22) Filed: Jun. 13, 2003

(65) Prior Publication Data

US 2004/0196000 A1 Oct. 7, 2004

(30) Foreign Application Priority Data

Apr. 3, 2003 (TW) .................................... 92205271 U (51) Int. Cl.[7] .............................................. H01M 10/46
(52) U.S. Cl. ...................................................... 320/111
(58) Field of Search ................................ 320/107, 111, 320/113, 115; 439/136, 138, 142

(56) References Cited

U.S. PATENT DOCUMENTS 5,918,187 A * 6/1999 Weng .......................... 455/573
5,923,146 A * 7/1999 Martensson .................. 320/111
5,998,964 A * 12/1999 Martensson .................. 320/111

* cited by examiner

Primary Examiner—Edward H. Tso
(74) Attorney, Agent, or Firm—Dennison, Schultz, Dougherty & MacDonald (57) ABSTRACT

A battery charger having an attached base includes a battery charger main body having a power plug and a connected wire with a predetermined length; and a base consisted of left and right housings and provided with upper and lower guiding orifices such that the wire enters the base via the upper guiding orifice and an outer end of the wire connected to a plug is extended out of the base via the lower guiding orifice. Wherein, the base is provided with a storage recess at an inner surface thereof, an inner surface of the main body may be superposed onto the inner surface of the base, and the power plug is placed and concealed in the storage recess. According to the invention, the plug is placed and concealed in the storage recess, and the battery charger may be packaged and stored by occupying minimal space.

6 Claims, 10 Drawing Sheets

BATTERY CHARGER HAVING ATTACHED BASE

BACKGROUND OF THE INVENTION (a) Field of the Invention

The invention relates to a battery charger having an attached base, and more particularly, to a battery charger in which a wire thereof is extended and connected with a base thereof, thereby enabling the battery charger to be selectively superposed with the base.

(b) Description of the Prior Art

According to the Taiwan Patent Publication No. 469997, Mobile Phone Battery Charger Having Convenient Portability and Wire Winding, a wire winding device thereof is disposed within a main body of the battery charger, and is observed to have the following shortcomings:

1. A conductive plug thereof is disposed in a protruding manner at a side of the main body of the battery charger, and therefore packaging and storage of the invention cannot be conducted in a regular manner while also occupying much space. In addition, the plug is prone to oxidation from contacting with external and surrounding air.

2. An entire volume of the invention is enlarged because the winding device thereof is directly disposed on the main body of the battery charger. Also, when the plug is inserted into a wall, the weight of the invention is reduced so that a connector terminal between the plug and a power socket inserted into is likely to disengage.

Referring to the U.S. Pat. No. 6,474,585B2, Wire Winding Box with Increasing Usable Area, when the invention is disposed at an interior of a battery charger, shortcomings also arise as the aforesaid prior invention: a conductive plug thereof protrudes at the exterior, the weight of the invention becomes comparatively heavier, and the invention cannot be packaged and stored in a regular manner.

Furthermore, in accordance with the inventor's prior invention disclosed in the U.S. Pat. No. 6,434,249B1, Earphone Wire Winding Box with Coaxial and Dual Wheels, the invention utilizes turning wheels and having different diameters, wherein the turning wheels and rotate regarding a same axis as a center of rotation thereof, such that when a signal wire stored in a large turning wheel is released, a lower wire stored in a storage groove at a small turning wheel only drops by a very small distance. The inventor's prior invention is indeed quite useful; nevertheless, the applications thereof are only limited to earphone wire winding boxes.

SUMMARY OF THE INVENTION

Therefore, a primary object of the invention is to provide a battery charger having an attached base, so as to conceal a conductive plug thereof by collapsing and superposing a battery charger main body thereof with a base thereof, thereby enabling the battery charger to be packaged and stored with minimal occupied space.

The other object of the invention is to provide a battery charger having an attached base, wherein a base thereof is disposed with a wire storage device for releasing and winding a wire of the battery charger.

DETAILED DESCRIPTION OF THE PREFERRED EMBODIMENTS

To better understand the characteristics and functions of the invention, descriptions shall be given with the accompanying drawings hereunder.

Figure 1:
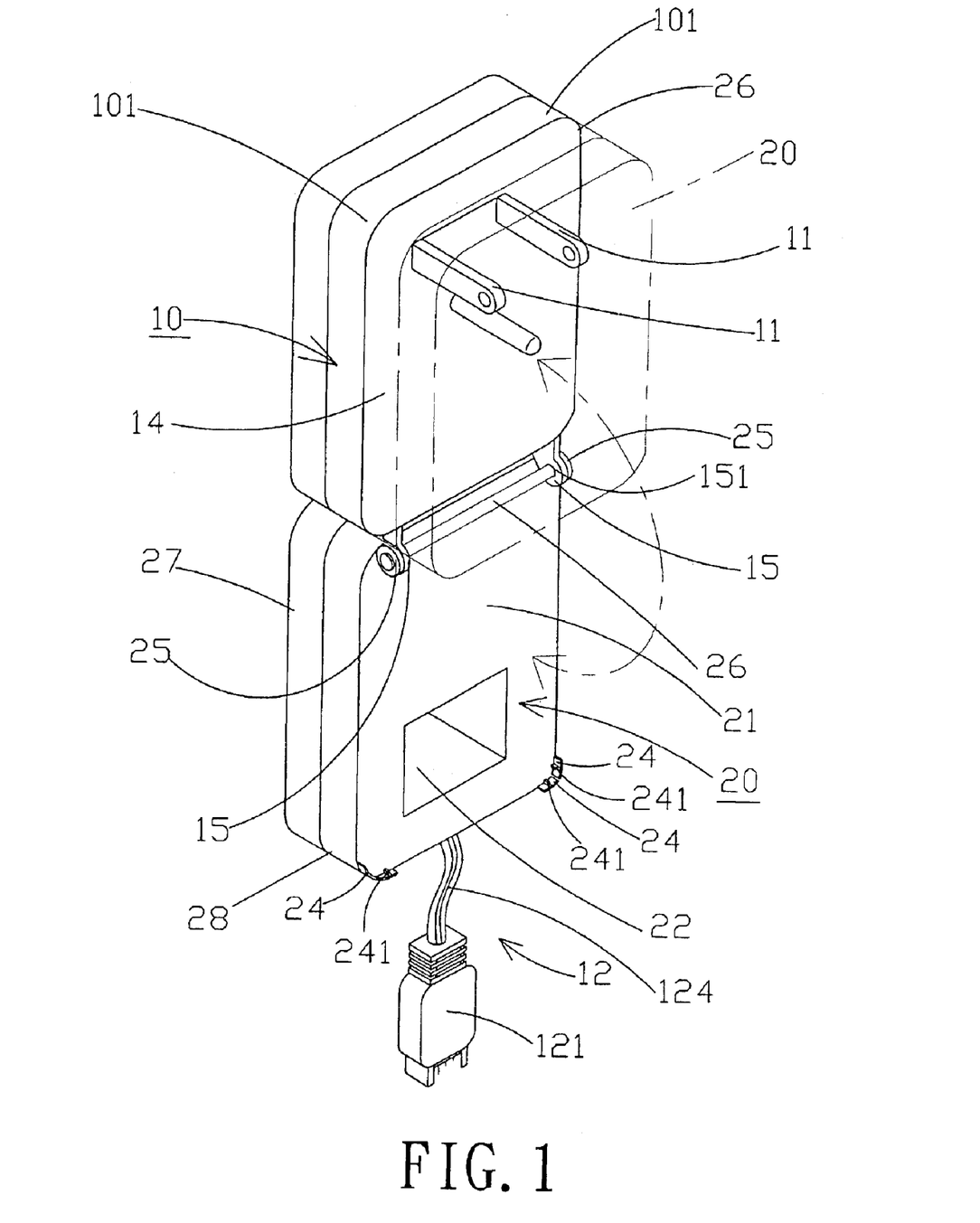
FIG. 1 shows an elevational view according to the invention.
Figure 2:
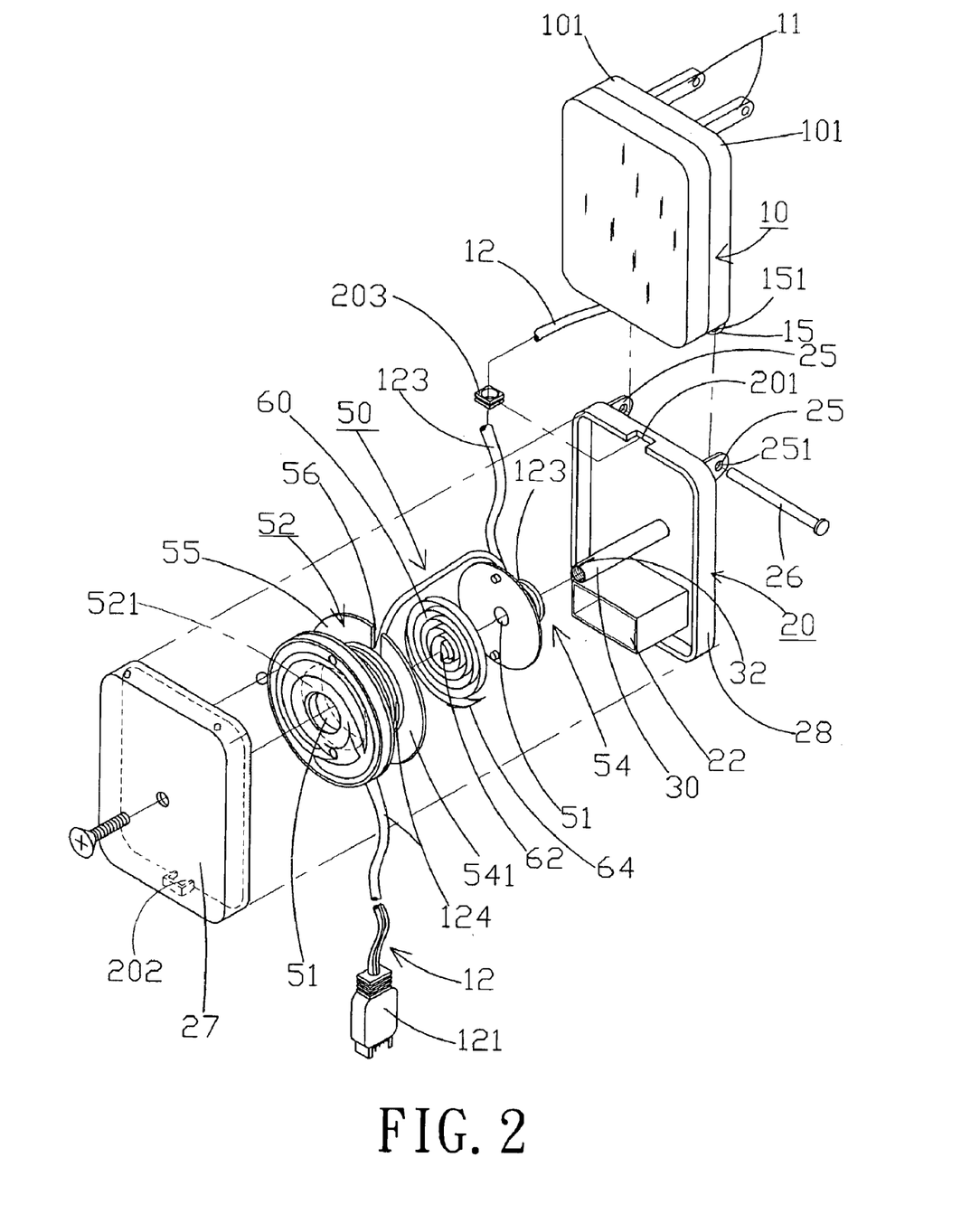
FIG. 2 shows an exploded elevational view according to the invention.

Referring to FIGS. 1 and 2, the invention comprises the characteristics of:

a battery charger main body 10 having a power plug 11 and a connected wire 12 with a predetermined length; and a base 20 consisted of left and right housings 27 and 28 and provided with upper and lower guiding orifices 201 and 202, such that the wire 12 enters the base 20 via the upper guiding orifice 201, and an outer end of the wire 12 connected to a plug 121 is extended out of the base 20 via the lower guiding orifice 202; wherein, the base 20 is provided with a storage recess 22 at an inner surface 21 thereof, an inner surface 14 of the main body 10 is mounted onto the inner surface 21 of the base 20, and the power plug 11 is placed and concealed in the storage recess 22.

According to the aforesaid primary characteristics, wherein:

a connection portion 15 is provided at a bottom end of the base 10 for flexibly connecting the main body 10 and base 20, and has axis openings 151; and the base 20 is disposed with lugs 25 at one side thereof, each of the lugs 25 is provided with an axis opening 251, such that an insertion twig 26 is penetrated through the axis openings 251 and 151 of the lugs 25 and the connection portion 15, respectively; and is further provided with fastening projecting members 24 at the other side thereof for fastening to the main body 10.

Figure 3:
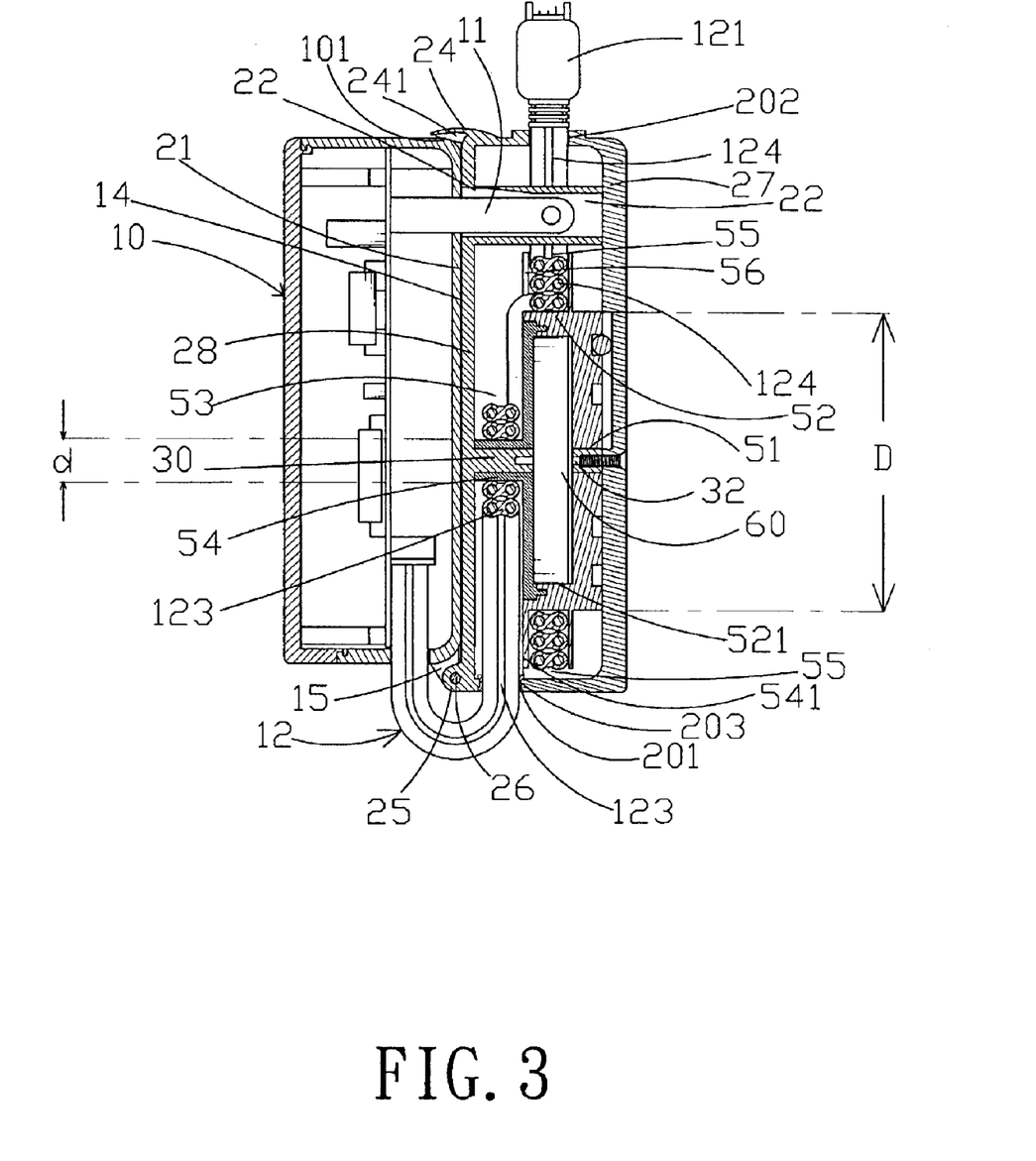
FIG. 3 shows a sectional view illustrating the invention being collapsed and superposed.

According to the aforesaid primary characteristics, wherein:

the right housing 28 (or the left housing 27) is provided with a protruding and an immovable axis 30 at an inner wall thereof; and a wire winding device 50 therein comprises a large turning wheel 52 having a larger diameter D, and connected to a small turning wheel 54 having a smaller diameter d at one side thereof (as shown in FIG. 3), wherein the large and small turning wheels 52 and 54 are provided with a same center opening 51 flexibly accommodated around the immovable axis 30, so that the large and small turning wheels 52 and 54 rotate regarding the immovable axis 30 as a center of rotation thereof; large and small wire storage grooves 55 and 53 formed at breadths of the large and small turning wheels 52 and 54, respectively; a wedge notch 56 formed at a lateral ring piece 541 at the breadth of the large turning wheel, such that a position of an appropriate length of the wire 12 is wedged in the wedge notch 56 for defining inner and outer wires 123 and 124; and a lateral recess 521 formed at a side wall of the large turning wheel 52; and a spring 60 has one inner end 62 wedged and fastened in a wedge channel 32 of the immovable axis 30, and the other end thereof placed and connected into a wedge channel (not shown in the diagram) provided in advance at a wall of the lateral recess 521.

Figure 8:
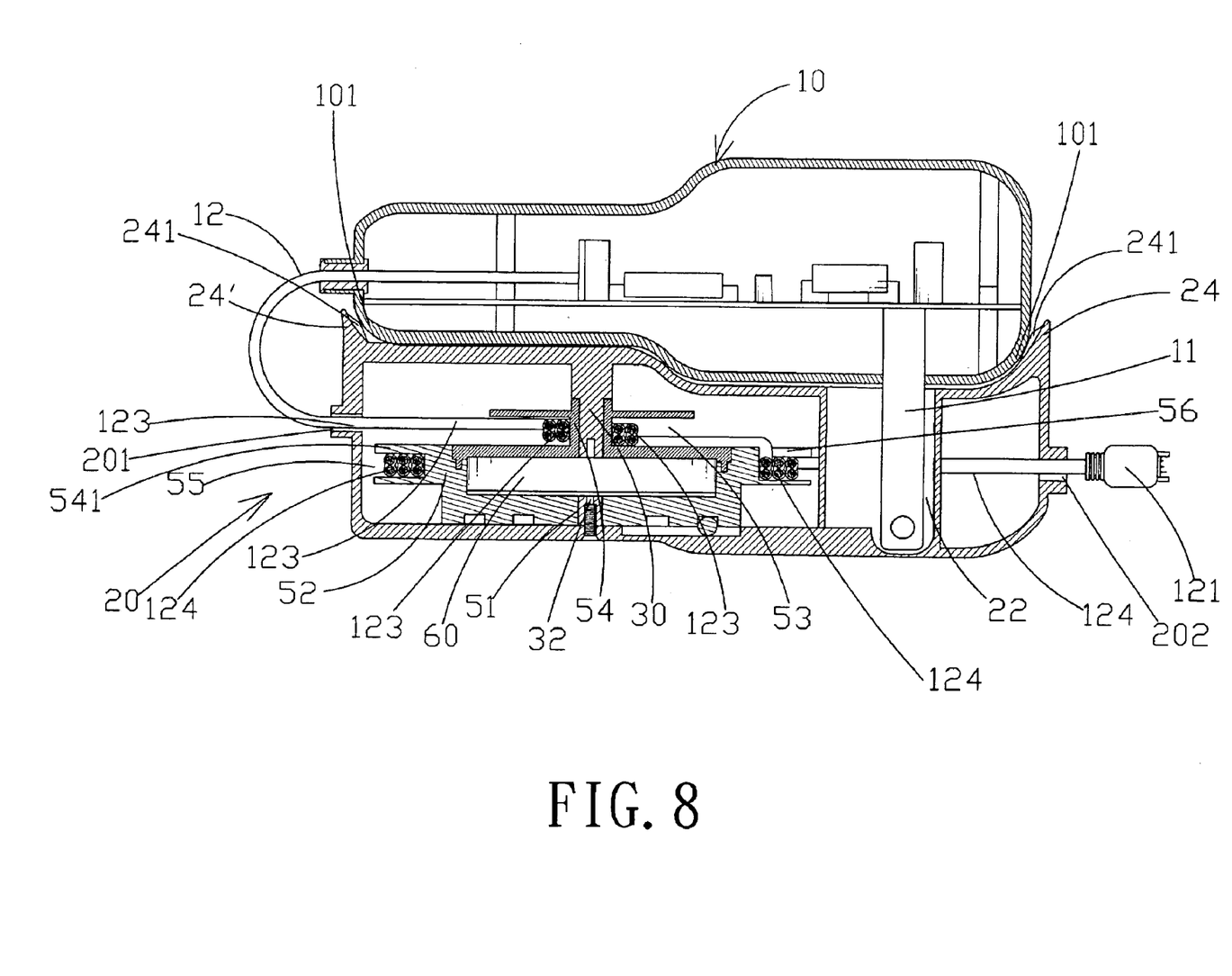
FIG. 8 shows a sectional view illustrating the base and battery charger of yet another embodiment according to the invention being collapsed and superposed.

According to the aforesaid primary characteristics, wherein when the main body 10 and the base 20 are not connected using the insertion twig 26, a lateral side of the base 20 is further disposed with a fastening projecting member 24' for wedging and fastening the base 10 as shown in FIG. 8.

Figure 5:
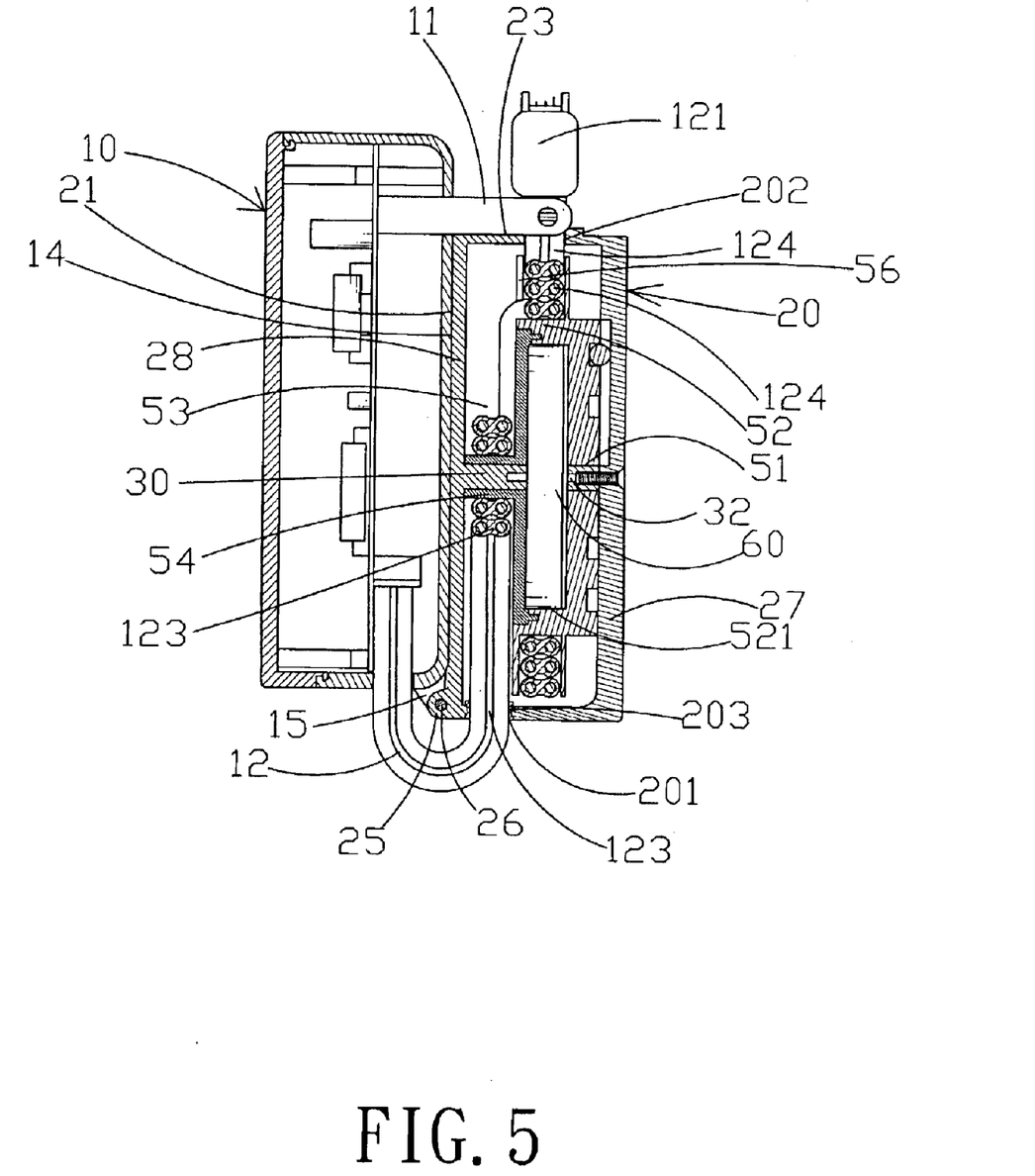
FIG. 5 shows a sectional view illustrating yet another embodiment according to the invention being collapsed and superposed.

According to the aforesaid primary characteristics, the base 20 has a volume smaller than that of the main body 10 and a length also shorter than that of the main body 10, the base 20 and the main body are superposed, and the power plug 11 is situated at an exterior of a side wall 23 of the base 20 as shown in FIG. 5.

Figure 10:
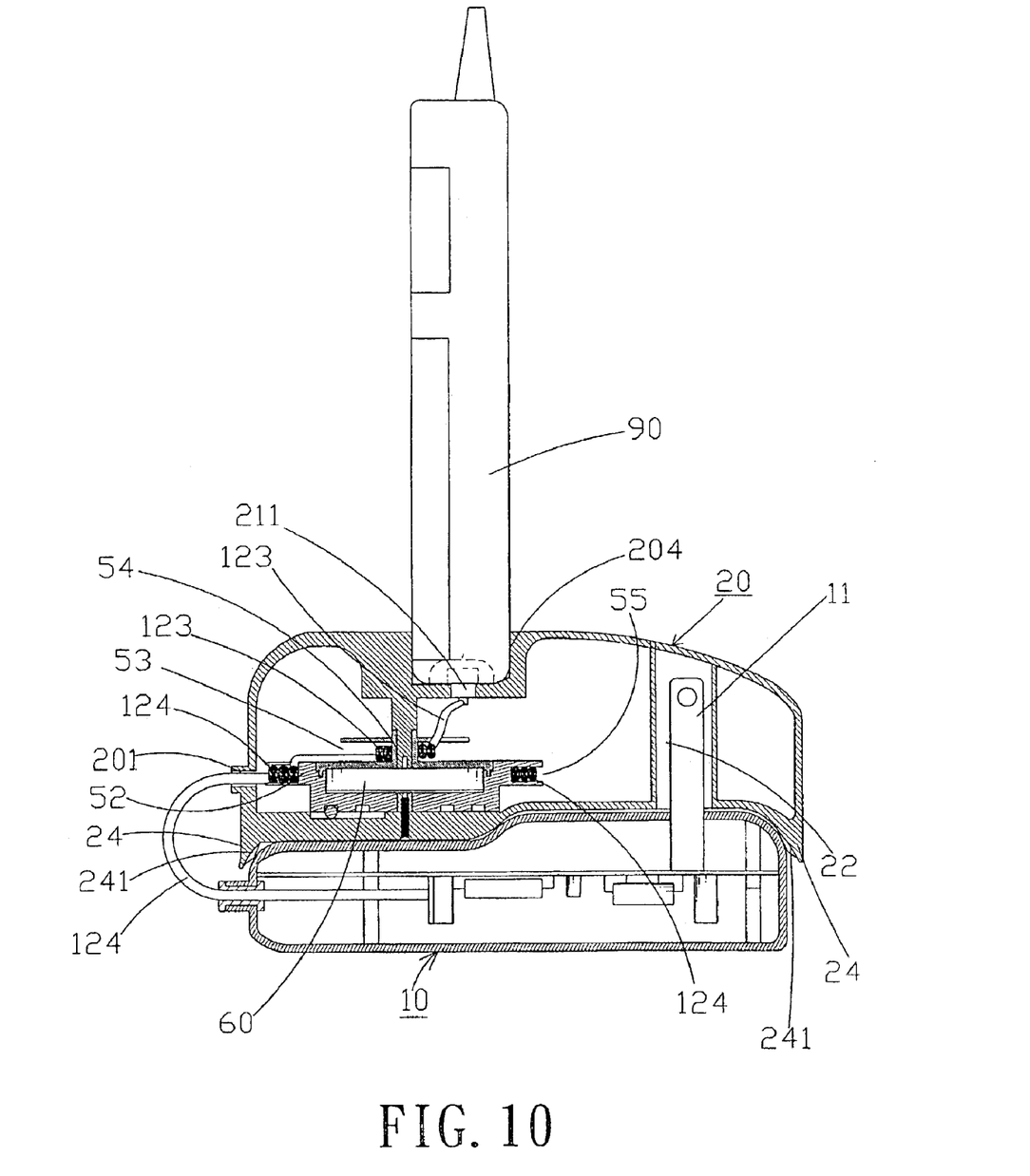
FIG. 10 shows a sectional view illustrating the base and battery charger of yet another embodiment according to the invention being collapsed and superposed.

According to the aforesaid primary characteristics, wherein a surface of the base 20 may additionally be disposed with a trough 204 having a terminal connection port 211 at a bottom end thereof as shown in FIG. 10.

EXAMPLES

1. Referring to FIGS. 1 and 2, the battery charger main body 10 is flexibly connected with the base 20 using the insertion twig 26, and hence the main body 10 is able to rotate regarding the insertion twig 26 as a rotation axis thereof. Also, the main body 10 may be selectively placed and superposed at the inner surface 21 of the base 20. Wherein, the fastening projecting members 24 made of a plastic material and having flexibility are disposed at corners at a side of the base 20. When the base 20 and the main body 10 are collapsed and superposed with each other, the fastening projecting members 24 are slightly deformed outward for that a lateral edge 101 of the main body 10 is pressed against inner protruding walls 241 of the fastening projecting members 24, thereby positioning and fastening the main body 10 onto the base 20. When the lateral edge 101 of the main body 10 leaves the fastening projecting members 24, the fastening projecting members 24 become elastically restored. Therefore, when the base 20 and the main body 10 are collapsed and superposed, the plug 11 is placed and concealed within the storage recess 22 at the base 20. Referring to FIG. 3, the structure of the invention as whole is a block-like shape in appearance and thus readily facilitates packaging, storage and carrying thereof. At the same time, the plug 11 is not exposed to the exterior when not in use for being concealed in the storage recess 22.

2. Referring to FIG. 8, the main body 10 and the base 20 are separated and are not connected using the insertion twig 26. The base 20 is disposed with fastening projecting members 24 and 24' at both sides thereof, respectively, and the lateral edge 101 of the main body 10 is then able to press against inner projecting walls of the fastening projecting members 24 and 24', so as to fasten the main body 10 onto the base 20. Similarly, the plug 11 is concealed in the storage recess 22.

Figure 7:
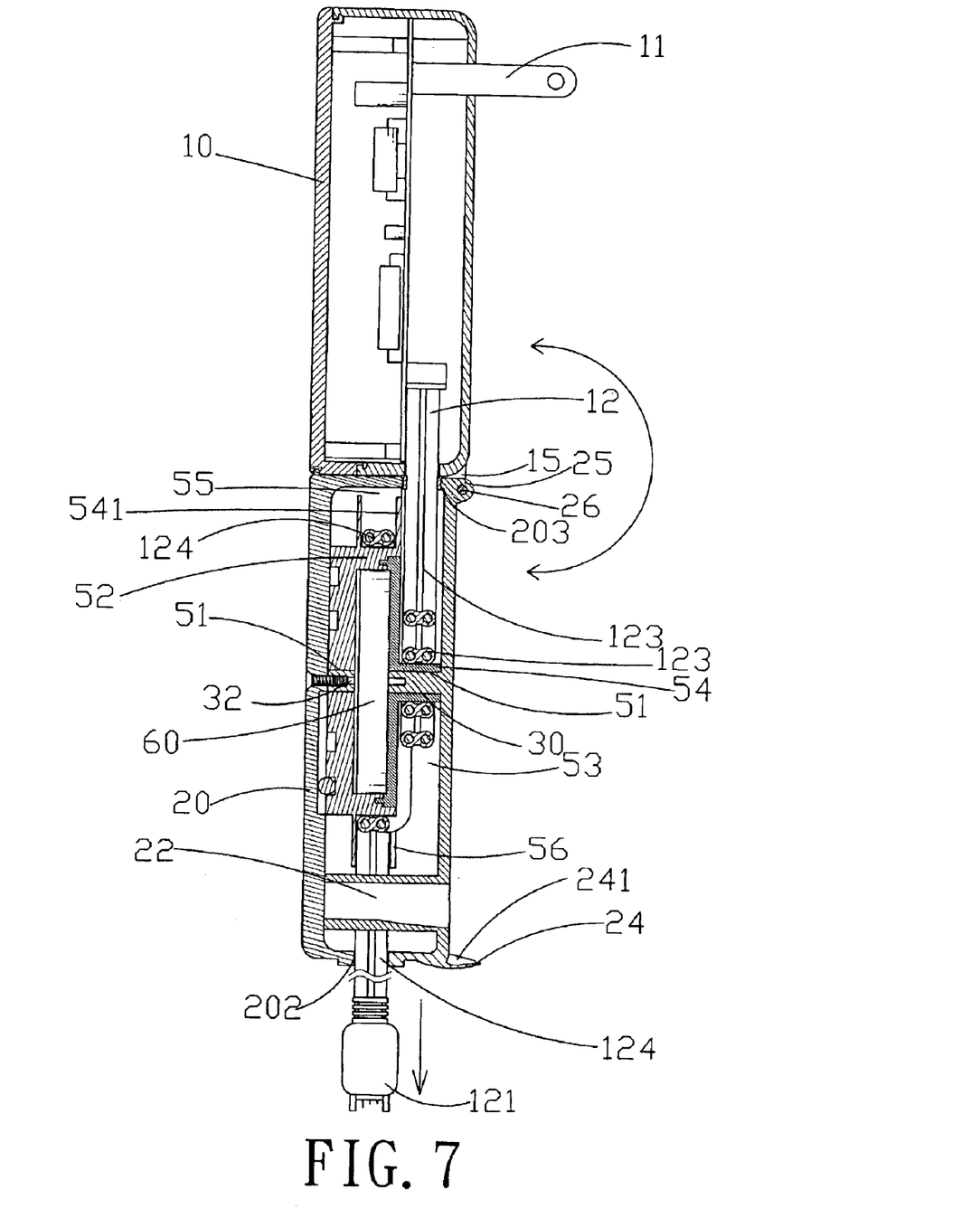
FIG. 7 shows a sectional view illustrating the base and battery charger main body according to the invention in an open status while releasing a wire simultaneously.

3. Referring to FIGS. 2 and 3, the base 20 is provided with the wire winding device 50. A portion of the wire 12 in the large storage groove is defined as the outer wire 124 and a portion of the wire 12 in the small storage groove is defined as the inner wire 123. The inner wire 123 and the outer wire 124 are defined and demarcated using the wedge notch 56; that is, a first fixed end of the wire 12 is formed at the wedge notch 56. In addition, a second fixed end is formed using an anti-slide sheath 203 fastening the inner wire 123 at the upper guiding orifice 201. When a hand of a user pulls the terminal plug 121 outward, the outer wire 124 is guided to the exterior via the lower guiding orifice 202, and the large and small turning wheels 52 and 54 rotate regarding the immovable axis 30 as a center axis thereof. For one revolution made by the large turning wheel 52, a length of the outer wire 124 released from (or winded into) the large wire storage groove 55 is $\pi \times D$, where D is a diameter of the large turning wheel 52. Similarly, for one revolution made by the small turning wheel 54, a length of the inner wire 123 released from (or winded into) the small wire storage groove 53 is $\pi \times d$, where d is a diameter of the small turning wheel 54. Consequently, when the large and small turning wheels 52 and 54 rotate coaxially, a ratio of lengths of the inner and outer wires 123 and 124 released or winded equals to the ratio of the diameters of the large and small turning wheels 52 and 54; that is to say, D:d. In a preferred embodiment of the invention, suppose that the ratio of the large and small turning wheels 52 and 54 is 10:1, when the length of the outer wire 124 released is 100 cm, the length of the inner wire 123 released is then 10 cm. Because the anti-slide sheath 203 forms a fixed end by fastening the inner wire 123, the inner wire 123 shows a lax state in an interior of the small wire storage groove 53 when being released from the small wire storage groove 53 as shown in FIG. 7, and hence concerns of extending of the inner wire 123 at the interior of the base 20 into an interior of the main body 10 are disregarded. The larger the ratio of the diameters (D:d) of the large and small turning wheels 52 and 54 gets, the shorter the length of the inner wire 123 is released from the smaller wire storage groove 53. Therefore, a lax state of the inner wire 123 in the small wire storage groove 53 resulted from releasing the wire is rather too small to cause a mess of the wire. Referring to FIG. 7, when the outer wire 124 is released to a limit thereof, due to a fastening effect provided by the wedge notch 56, the inner wire 123 still remains unmoved and is not released along with the outer wire 124.

Figure 4:
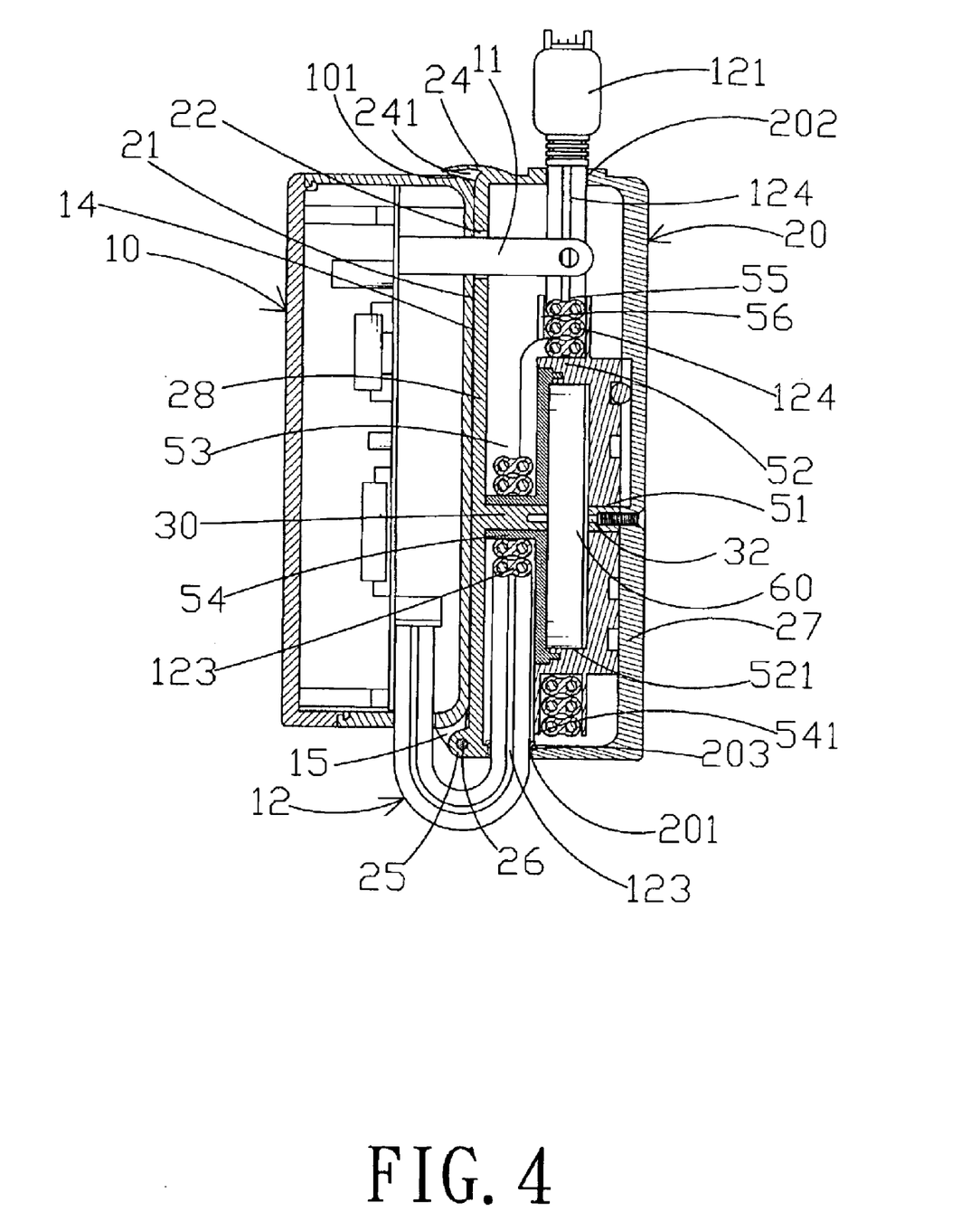
FIG. 4 shows a sectional view illustrating another embodiment according to the invention being collapsed and superposed.

Referring to FIGS. 2 and 3 again, elastic rotations of the large and small turning wheels 52 and 54 are accomplished by the spring 60. The spring 60 has the inner end 62 thereof fixed to the immovable axis 30 and the outer end 64 thereof fixed at a wall surface of the lateral recess 521, and therefore, as shown in FIGS. 3, 4 and 5, when a pulling force for extracting the outer wire 124 is let off, the large and small turning wheels 52 and 54 are able to rotate in a reverse direction due to contraction effects of the spring 60, so that the outer wire 124 is winded back into the large wire storage groove 55, and the inner wire 123 originally at a lax state is winded back to restore to a tightly rolled up state, thereby rapidly completing wire winding according to the invention. At this moment, the terminal plug 121 is halted at an outer edge of the lower guiding orifice 202 such that the wire 12 is winded and concealed in the interior of the base 20. Therefore, when the terminal plug 121 is extracted and the plug 11 is inserted into a power socket, the inner 123 is not released to the exterior of the base 20.

Figure 6:
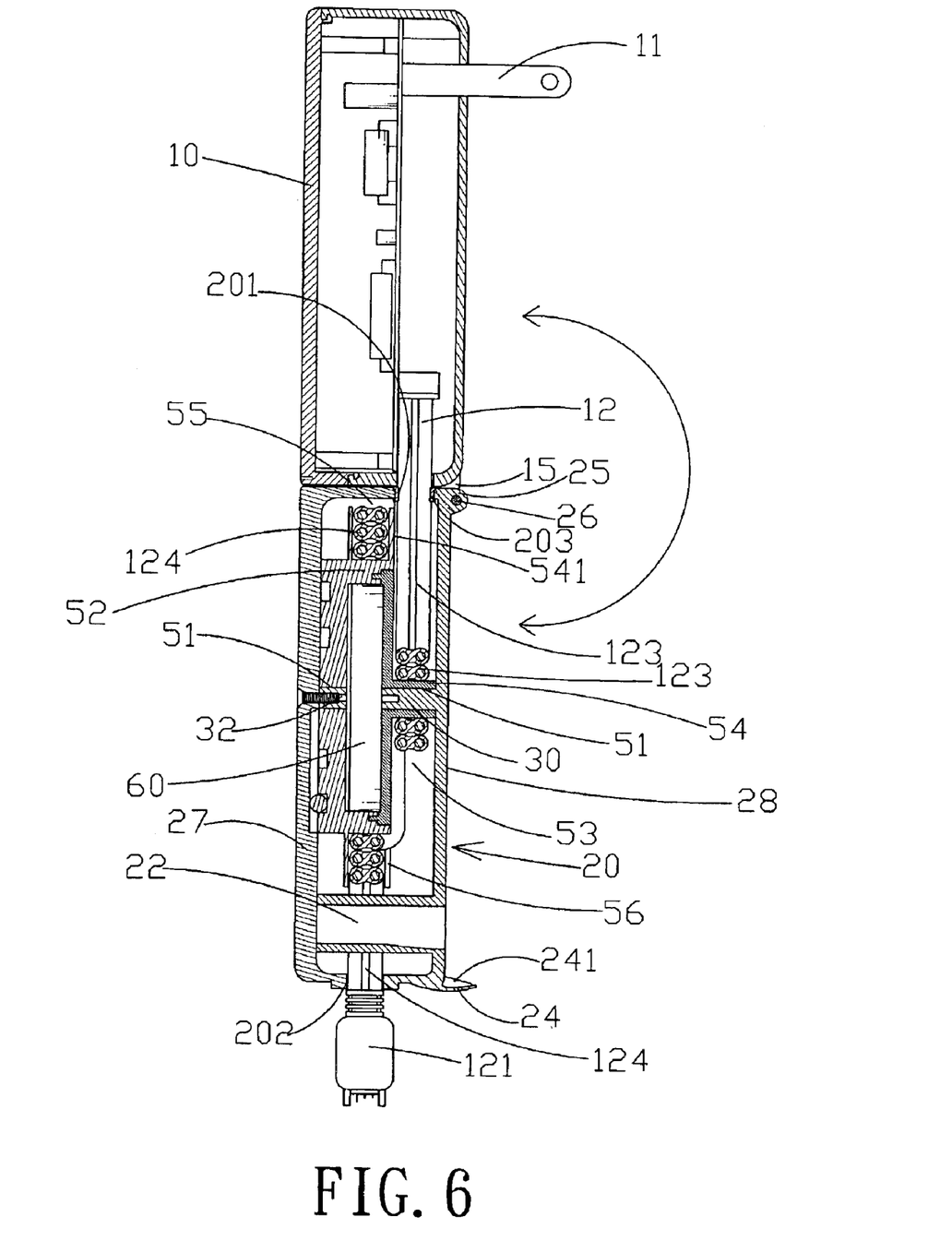
FIG. 6 shows a sectional view illustrating the base and battery charger main body according to the invention in an open status.

4. Referring to FIG. 5, the base 20 has a volume smaller than that of the main body 10 and a length also shorter than that of the main body 10. The storage recess 22 of the base 20 is then eliminated for being too insignificant. When the main body 10 and the base 20 are collapsed and superposed, the power plug 11 is situated at an exterior of a side wall 23. Referring to FIG. 6, the main body rotates using the insertion twig 26 as a rotation axis thereof, so that the main body 10 and the base 20 may be opened for the power plug 11 to insert into a power socket.

Referring to FIG. 4, the storage recess 22 may also be inserted and the plug 11 may be similarly placed and concealed in the interior of the base 20.

Figure 9:
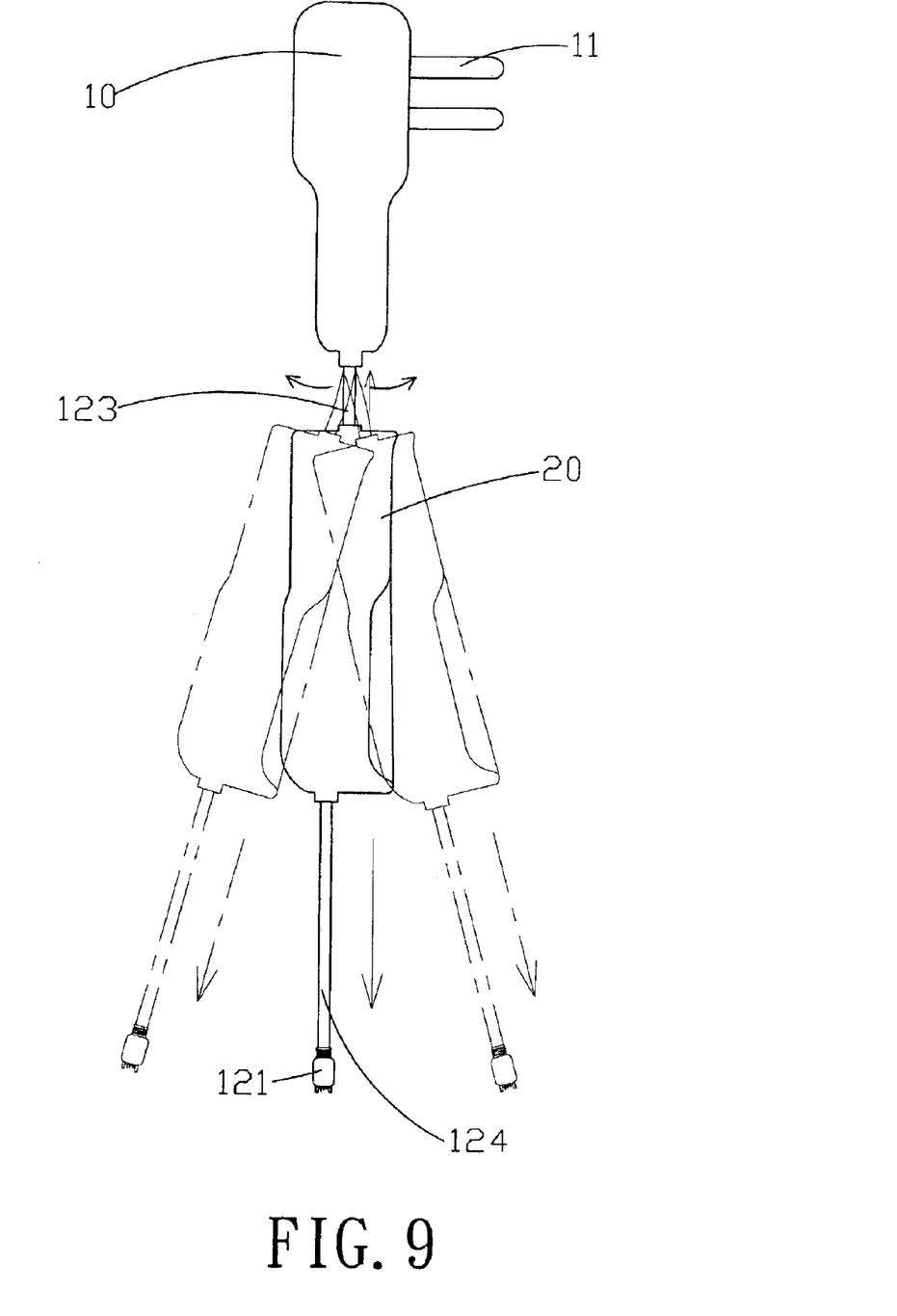
FIG. 9 shows a sectional view illustrating movements of the base and battery charger according to the invention being disengaged.

Referring to FIG. 9, the main body 10 and the base 20 are a separated design, and the anti-slide sheath 203 is not taken into consideration and is thus eliminated. Using this structure, when the outer wire 124 is released, the length of the inner wire 123 released is very small. As a result, when the outer wire 124 is released, a displacement distance produced between the base 20 and the main body 10 is also rather small, and hence leaving releasing of the outer wire 124 unaffected. Referring to FIG. 10, the base 20 is disposed with the trough 204 for placing a handset 90, wherein the trough 204 is provided with the conducting terminal connection port 211 at the bottom end thereof. Charging signals outputted from a charger circuit at the interior of the main body 10 are then able to charge a battery of the handset 90 through the conducted outer wire 124, the inner wire 123 and the terminal connection port 211, and the lower guiding orifice 202 of the base 20 may then be eliminated.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A battery charger having an attached base comprising the characteristics of:
   a battery charger main body having a power plug, and a connected wire with a predetermined length; and
   a base consisted of left and right housings and provided with upper and lower guiding orifices such that the wire enters the base via the upper guiding orifice and an outer end of the wire connected to a plug is extended out of the base via the lower guiding orifice; wherein the base is provided with a storage recess at an inner surface thereof, an inner surface of the main body may be superposed onto the inner surface of the base, and the power plug is placed and concealed in the storage recess.

2. The battery charger having an attached base in accordance with claim 1, wherein a connection structure provided at a bottom end of the base for flexibly connecting the main body and the base is a connection portion that is further disposed with axis openings; and the base is disposed with lugs at one side thereof with each of the lugs provided with an axis opening such that an insertion twig is penetrated through the axis openings of the lugs and the connection portion, respectively, and the base is provided with fastening projecting members at the other side thereof for fastening the main body.

3. The battery charger having an attached base in accordance with claim 1, wherein:
   one of the right housing and the left housing is provided with a protruding and an immovable axis at an inner wall thereof; and
   a wire winding device therein further comprises:
      a large turning wheel having a larger diameter D and connected to a small turning wheel having a smaller diameter d at one side thereof, wherein the large and small turning wheels are provided with a same center opening flexibly accommodated into the immovable axis, so that the large and small turning wheels rotate regarding the immovable axis as a center of rotation thereof; large and small wire storage grooves formed at breadths of the large and small turning wheels, respectively; a wedge notch formed at a lateral ring piece at the breadth of the large turning wheel, such that a position of an appropriate length of the wire is wedged in the wedge notch for defining inner and outer wires; and a lateral recess formed at a side wall of the large turning wheel; and
      a spring has one inner end wedged and fastened in a wedge channel of the immovable axis, and the other end thereof placed and connected into a wedge channel provided in advance at a wall of the lateral recess.

4. The battery charger having an attached base in accordance with claim 1, wherein when the main body and the base are not connected by the insertion twig, a lateral side of the base is further disposed with fastening projecting members for wedging and fastening the base.

5. The battery charger having an attached base in accordance with claim 1, wherein the base has a volume smaller than that of the main body and a length also shorter than that of the main body, the base and the main body are superposed, and the power plug is situated at an exterior of a side wall of the base.

6. The battery charger having an attached base in accordance with claim 1, wherein a surface of the base is additionally disposed with a trough having a terminal connection port at a bottom end thereof.

* * * * *